(12) United States Patent
Ohashi

(10) Patent No.: US 9,247,140 B2
(45) Date of Patent: Jan. 26, 2016

(54) VIBRATION-TYPE DRIVING UNIT, TWO-DIMENSIONAL DRIVING APPARATUS, IMAGE-BLUR CORRECTION APPARATUS, INTERCHANGEABLE LENS, IMAGE CAPTURING APPARATUS, AND AUTOMATIC STAGE

(71) Applicant: CANON KABUSHIKI KAISHA, Tokyo (JP)

(72) Inventor: Kaishi Ohashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/249,053

(22) Filed: Apr. 9, 2014

(65) Prior Publication Data
US 2014/0307113 A1   Oct. 16, 2014

(30) Foreign Application Priority Data

Apr. 12, 2013   (JP) .................................. 2013-083496
Feb. 21, 2014   (JP) .................................. 2014-032214

(51) Int. Cl.
| | |
|---|---|
| *H04N 5/232* | (2006.01) |
| *H02N 2/00* | (2006.01) |
| *H02N 2/10* | (2006.01) |
| *H02N 2/02* | (2006.01) |

(52) U.S. Cl.
CPC ........... *H04N 5/23287* (2013.01); *H02N 2/004* (2013.01); *H02N 2/0055* (2013.01); *H02N 2/0095* (2013.01); *H02N 2/026* (2013.01); *H02N 2/028* (2013.01); *H02N 2/103* (2013.01); *H02N 2/108* (2013.01); *H04N 5/2328* (2013.01); *G03B 2205/0061* (2013.01)

(58) Field of Classification Search
CPC ................................................. G03B 2205/0061
See application file for complete search history.

(56) References Cited

U.S. PATENT DOCUMENTS

| | | | | |
|---|---|---|---|---|
| 8,164,233 | B2 * | 4/2012 | Mukae | 310/323.01 |
| 2010/0060107 | A1 * | 3/2010 | Seki et al. | 310/323.16 |
| 2010/0171392 | A1 * | 7/2010 | Mukae | 310/328 |
| 2012/0268642 | A1 * | 10/2012 | Kawai | 348/335 |
| 2013/0147978 | A1 * | 6/2013 | Ohashi et al. | 348/208.7 |

FOREIGN PATENT DOCUMENTS

| | | |
|---|---|---|
| JP | 6-311765 A | 11/1994 |
| JP | 2006-345629 A | 12/2006 |
| JP | 2012-044832 A | 3/2012 |
| JP | 2012-130231 A | 7/2012 |
| WO | WO2012/026079 A1 | 3/2012 |

* cited by examiner

*Primary Examiner* — Twyler Haskins
*Assistant Examiner* — Akshay Trehan
(74) *Attorney, Agent, or Firm* — Canon USA Inc. IP Division

(57) ABSTRACT

A vibration-type driving unit includes a vibrator including an electro-mechanical transducer; a moving body provided with the vibrator; a contact member in contact with the vibrator provided on the moving body; a support member configured to support the contact member; and a moving mechanism configured to move the moving body relative to the support member. The vibrator and the contact member are disposed so that the vibrator moves in a first direction relative to the contact member. The moving mechanism is configured to move the moving body relative to the support member in a second direction intersecting the first direction in a plane parallel to a plane in which the vibrator and the contact member are in contact with each other.

26 Claims, 15 Drawing Sheets

VIBRATION-TYPE DRIVING UNIT, TWO-DIMENSIONAL DRIVING APPARATUS, IMAGE-BLUR CORRECTION APPARATUS, INTERCHANGEABLE LENS, IMAGE CAPTURING APPARATUS, AND AUTOMATIC STAGE

BACKGROUND OF THE INVENTION

1. Field of the Invention

The present invention relaters to a vibration-type driving unit, as well as a two-dimensional driving apparatus, an image-blur correction apparatus, an interchangeable lens, an image capturing apparatus, or an automatic stage including the vibration-type driving unit.

2. Description of the Related Art

Great many vibration-type driving units that excite vibrations in a vibrator to move a moving body that is in pressure-contact therewith have been proposed.

They are positioned as important functional components particularly in optical devices which are required to operate accurately. An example thereof is a two-dimensional driving apparatus including a plurality of linear vibration-type driving units (a type capable of linearly moving a moving body), in which the driving operations thereof are combined, allowing two-dimensional movement of the moving body.

Another known example is an image-blur correction apparatus using this two-dimensional driving apparatus (for example, Japanese Patent Laid-Open No. 2012-44832).

However, the method of combining driving operations of a plurality of vibration-type driving units has the following problems to be solved.

For example, the moving direction of the moving body and the driving direction of some of the plurality of vibration-type driving units sometimes intersect at right angles or at angles close to right angles depending on the moving direction of the moving body.

In this case, not only the vibration-type driving unit whose driving direction intersects the moving direction at right angles or angles close to right angles cannot contribute to driving, but also a frictional force due to the contact between the moving body and the vibration-type driving unit exerts a load on the movement of the moving body to cause an energy loss, resulting in an output loss.

This may cause a decrease in characteristics when used as, for example, a two-dimensional driving apparatus, an image-blur correction apparatus, an interchangeable lens, an image capturing apparatus, or an automatic stage.

To solve these problems, Japanese Patent Laid-Open No. 2012-44832 discloses a configuration having a moving mechanism (a deflecting mechanism) that allows a vibrator to move in a direction (a deflecting direction) intersecting the driving direction.

Therefore, the vibrator and the moving body are configured not to move relative to each other in the deflecting direction.

By forming the deflecting mechanism with a guide mechanism having a remarkably small sliding loss or an elastic spring having low rigidity, a load that acts on the moving body can be made extremely small. This remarkably reduces the output loss.

However, the output-loss reduction unit for the vibration-type driving unit, the two-dimensional driving apparatus, or the image-blur correction apparatus described above mainly has the following problems.

The first problem is that the occupied space is large.

In the related art example described above, a component in contact with the vibrator is moved in the driving direction of the vibration-type driving unit by the vibration of the fixed vibrator, thereby moving the moving body fixed thereto.

To allow a predetermined amount of movement of the moving body, the sum (length) of the dimension (length) of the component in contact with the vibrator and the amount of movement (moving distance) thereof is needed as an occupied space (length), thus increasing the size of the apparatus.

Another problem is that unnecessary vibrations are prone to occur in the component in contact with the vibrator.

Unnecessary vibrations make the state of contact between the vibrator and the component in contact with the vibrator unstable, leading to unstable output.

SUMMARY OF THE INVENTION

An aspect of the present disclosure relates to a vibration-type driving unit, a two-dimensional driving apparatus, an image-blur correction apparatus, an interchangeable lens, an image capturing apparatus, or an automatic stage in which at least an increase in the occupied space or unnecessary vibrations can be reduced, thus allowing the loss of output to be reduced.

A first aspect of the present disclosure relates to a vibration-type driving unit including a vibrator including an electro-mechanical transducer; a moving body provided with the vibrator; a contact member in contact with the vibrator; a support member configured to support the contact member; and a moving mechanism configured to move the moving body relative to the support member. The vibrator and the contact member are disposed so that the vibrator moves in a first direction relative to the contact member; and the moving mechanism is configured to move the moving body relative to the support member in a second direction intersecting the first direction in a plane parallel to a plane in which the vibrator and the contact member are in contact with each other.

Another aspect of the present disclosure relates to a vibration-type driving unit including a vibrator including an electro-mechanical transducer; a contact member in contact with the vibrator; and a moving body comprising: a moving-body main portion; a vibrator fixing portion configured to fix the vibrator; and a moving mechanism configured to move the moving-body main portion relative to the vibrator. The vibrator and the contact member are disposed so that the vibrator moves in a first direction relative to the contact member; and the moving mechanism is configured to move the moving body relative to the vibrator in a second direction intersecting the first direction in a plane parallel to a plane in which the vibrator and the contact member are in contact with each other.

Another aspect of the present disclosure relates to a two-dimensional driving apparatus including at least the vibration-type driving unit described above; and a driving unit whose driving direction intersects the driving direction of the vibration-type driving unit.

Another aspect of the present disclosure relates to an image-blur correction apparatus including the vibration-type driving unit described above; and an optical lens or an image sensor mounted to the moving body of the vibration-type driving unit.

Another aspect of the present disclosure relates to an image capturing apparatus including the vibration-type driving unit described above; an optical lens or an image sensor mounted to the moving body of the vibration-type driving unit; and a power source.

Another aspect of the present disclosure relates to an interchangeable lens including the vibration-type driving unit described above; an optical lens or an image sensor mounted to the moving body of the vibration-type driving unit; and a power source.

Another aspect of the present disclosure relates to an automatic stage including the vibration-type driving unit described above, wherein the moving body has an observation-target mount portion.

Further features of the present invention will become apparent from the following description of exemplary embodiments with reference to the attached drawings.

DESCRIPTION OF THE EMBODIMENTS

Figure 1:
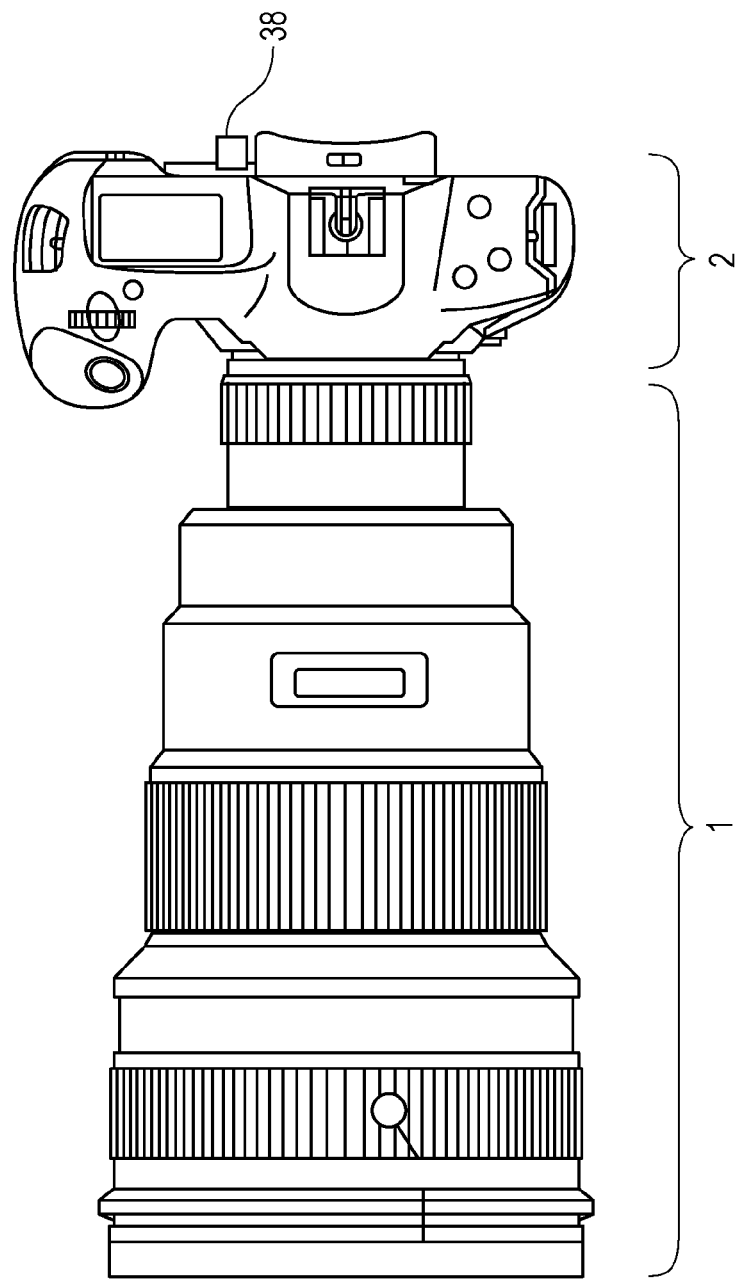
FIG. 1 is a diagram showing the configuration of a camera serving as an image capturing apparatus.

Next, embodiments of the present invention will be described.

A vibration-type driving unit according to an embodiment of the present invention includes a vibrator having an electromechanical transducer and a contact member that is driven in a first direction relative to the vibrator by vibrations excited in the vibrator.

The vibration-type driving unit further includes a support member that supports the contact member, a moving body to which the relative movement is transmitted, and a moving mechanism that can move the moving body in a second direction relative to the support member. The moving mechanism is configured such that the second direction intersects the first direction in a plane parallel to a plane in which the vibrator and the contact member are in contact with each other.

Here, "a plane in which the vibrator and the contact member are in contact with each other" is a virtual plane including a plurality of contact points at which the vibrator and the contact member are in contact with each other.

"A plane parallel to a plane in which the vibrator and the contact member are in contact with each other" is a virtual plane substantially parallel to the virtual "plane in which the vibrator and the contact member are in contact with each other" and comprises innumerable planes.

These planes are planes for specifying the moving direction of the moving mechanism of an embodiment of the present invention, including not only a plane strictly parallel to the plane in which the vibrator and the contact member are in contact but also a substantially parallel plane. The planes are specified to determine the first direction and the second direction.

The first direction is a direction in which the relative position of the vibrator and the contact member changes, which is also referred to as a driving direction. The second direction is a direction in which the moving body can be moved relative to the support member (or the moving-body main portion can be moved relative to the vibrator) by the moving mechanism, which is also referred to as "a deflecting direction".

The term "deflecting" refers to moving, when a force in the direction (the second direction) intersecting the driving direction (the first direction) of the vibration-type driving unit acts on the moving body, without resisting the force.

The vibration-type driving unit of an embodiment is configured such that the contact member is supported by the support member, the vibrator is driven by the vibrations of itself, and the driving is transferred to the moving body.

In this embodiment, the configuration that allows the moving body to be selectively moved in the second direction relative to the support member (that does not allow the contact member and the vibrator move relatively in the first direction while the vibrator is stopped) can be achieved by providing a moving mechanism that can move the moving body only in the second direction between the support member and the contact member.

The configuration can be achieved by providing a moving mechanism that can move the moving body only in the second direction between the vibrator and the moving body. The moving mechanism may be a guide member or an elastic member (typically, a spring member) that tends to be displaced only in a specific direction.

A state in which "a force in the direction (the second direction) intersecting the driving direction (the first direction)" is present refers to a state in which a force having a component in a direction different from the driving direction or the first direction is present (a force moving the subject in a direction different from the first direction is generated).

The state in which a force moving the subject in a direction different from the driving direction acts causes an output loss as described above.

Although the output loss most likely occurs typically at an angle of intersection of the first direction and the second direction of 90° C., slight intersection can cause an output loss corresponding to the angle of intersection.

The vibrator of this embodiment includes a vibration plate (also referred to as a vibrating body) and an electro-mechanical transducer (typically, a piezoelectric device, such as a piezoelectric ceramic). The vibrator can excite a desired vibration by applying a predetermined electric field to the electro-mechanical transducer.

The linear vibration-type driving unit in this case is a linearly driving vibration-type driving unit, which is also referred to as a linear vibration-type driving unit.

A single linear vibration-type driving unit linearly drives the vibrator relative to the support member. Combining a plurality of linear vibration-type driving units allows the moving body multidimensionally in desired directions.

With the configuration of the embodiment, a vibration-type driving unit that is not responsible for moving the moving body can be made compact and the output thereof can be stabilized when reducing an output loss caused by the load of a frictional force due to the contact between the vibrator and the contact member.

[Embodiments]

Although embodiments of the present invention will be described hereinbelow, the present invention is not limited to the configurations of the embodiments.

[First Embodiment]

FIG. 1 is a diagram showing the configuration of a camera serving an image capturing apparatus according to a first embodiment of the present invention.

The camera in FIG. 1 has the function of capturing a moving image and a still image. Reference sign 1 denotes a lens barrel including an image-blur correction apparatus, and reference sign 2 denotes a camera body including an image sensor 36 (a photoelectric transducer or the like).

Figure 2:
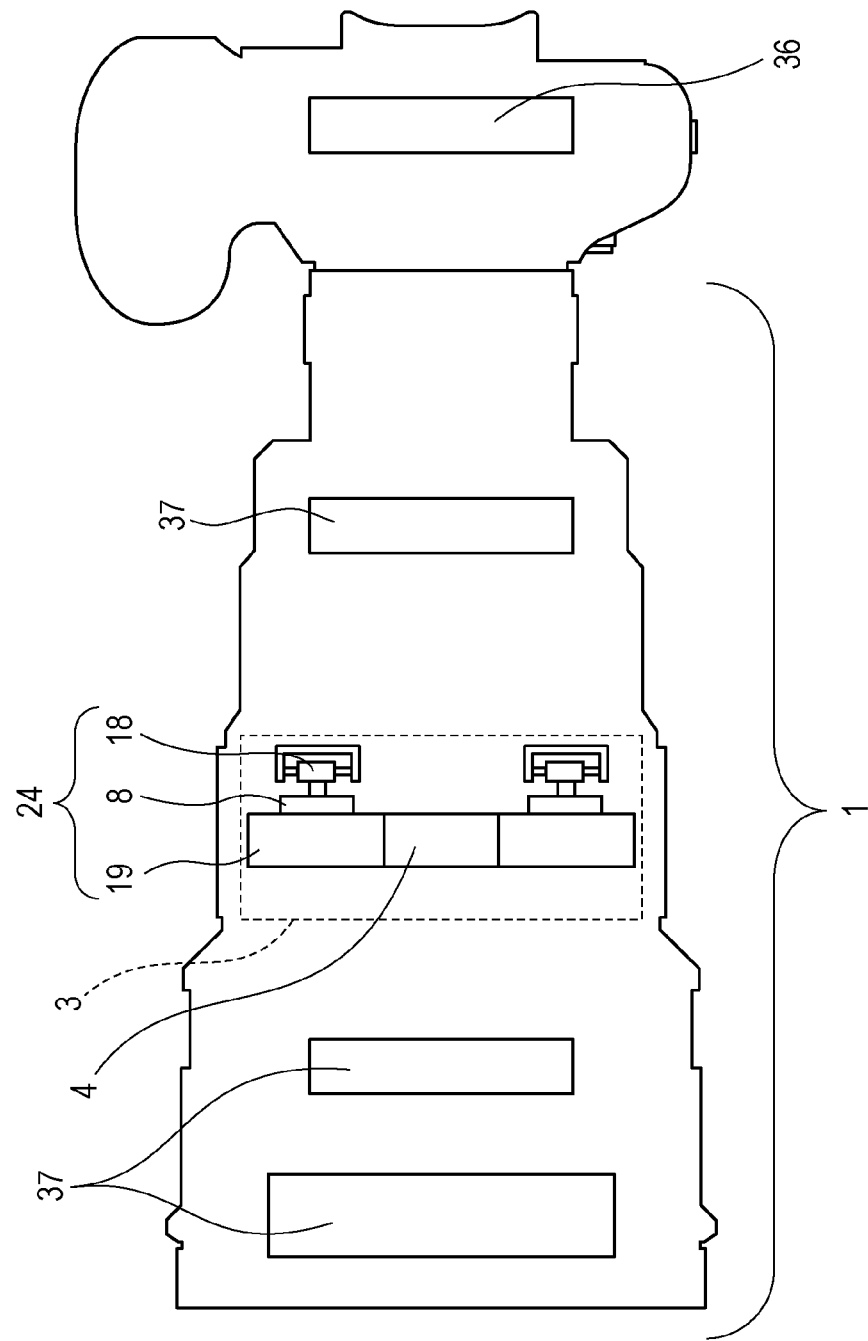
FIG. 2 is a schematic diagram illustrating the interior of a lens barrel and a camera body.

FIG. 2 is a schematic diagram illustrating the interior of the lens barrel 1 and the camera body 2.

In FIG. 2, reference sign 3 denotes the image-blur correction apparatus.

Reference sign 4 denotes an optical lens and reference sign 24 denotes a vibration-type driving unit. Reference sign 19 denotes a moving body, to which the optical lens 4 is mounted in this example.

Reference sign 18 denotes a contact member, which is in pressure-contact with a vibrator 8. By causing the vibrator 8 to vibrate in an elliptical locus, the vibrator 8 is driven relative to the contact member 18 by the friction between it and the contact member 18.

The vibrator 8 is configured to transmit displacement and force to the moving body 19. With this configuration, the optical lens 4 can be moved by the vibrator 8.

The lens barrel 1 shown in FIG. 2 can be replaced as an interchangeable lens. An interchangeable lens suited to an image acquisition target can be mounted to the camera body 2.

The lens barrel 1 is provided with an optical system 37 in addition to the optical lens 4. Although not shown in FIG. 2, the camera further includes an acceleration sensor for detecting the shake of the lens barrel 1 and an encoder for detecting two-dimensional movement of the moving body 6.

The camera further includes a power source 38 that supplies electrical energy to the vibration-type driving unit 5 and a control unit incorporating a control method for operating the power source 38 by processing a signal output from the acceleration sensor and a signal output from the encoder.

Light from a subject passes through an optical system including the optical lens 4 in the lens barrel 1 and enters an image sensor 36 in the camera body 2.

By moving the optical lens 4 with the image-blur correction apparatus 3 on the basis of a signal from the acceleration sensor, an image blur due to movement of hands or the like can be corrected.

Although an example in which the optical lens 4 is mounted to the moving body 19 is shown here, the present invention is not limited thereto; for example, an image sensor may be mounted to the moving body 19, and the image sensor is moved by the image-blur correction apparatus 3 so that an image blur is corrected.

In this example, the image-blur correction apparatus 3 is provided in the lens barrel 1. The present invention is not limited thereto; the lens barrel 1 may be separate from the camera body 2, and the lenses and the image-blur correction apparatus 3 may be provided in the camera body 2.

Figure 3:
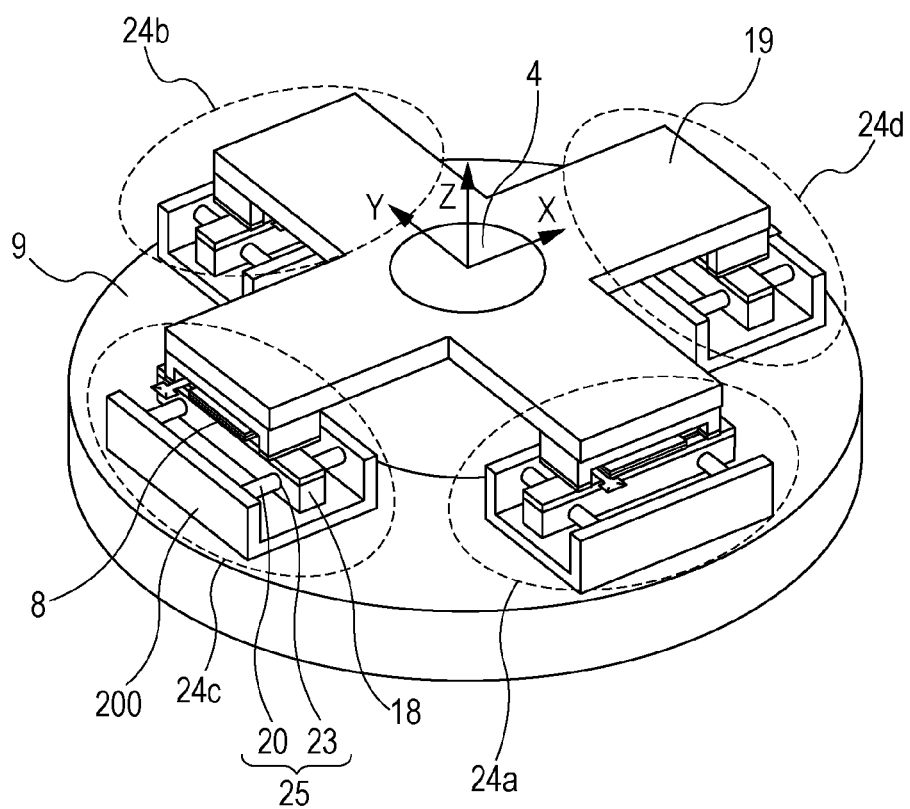
FIG. 3 is a perspective view of an image-blur correction apparatus.

FIG. 3 is a perspective view of the image-blur correction apparatus 3. Reference sign 9 denotes part of the lens barrel 1.

The lens barrel 1 includes four vibration-type driving units 24 (24a, 24b, 24c, and 24d). The vibration-type driving units 24a to 24d share the moving body 19. The moving body 19 retains the optical lens 4. The vibration-type driving units 24 are linearly driving actuators.

The driving direction (the first direction) of the vibration-type driving units 24a and 24b is an X-direction in FIG. 3.

The driving direction (the second direction) of the vibration-type driving units 24c and 24d is a Y-direction in FIG. 3. By combining the drives of the four vibration-type driving units 24, the two-dimensional driving apparatus 3 capable of two-dimensional driving (in the X-direction, in the Y-direction, and about the Z-axis) of the moving body 19 is achieved. In addition to that, the optical lens 4, the acceleration sensor, the encoder, and the control unit for image-blur correction are provided to configure the image-blur correction apparatus 3.

The vibration-type driving units 24 of the first embodiment each include the vibrator 8, the contact member 18, a moving mechanism 25, a support member 200, and the moving body 19. The moving mechanism 25 includes two hole-shaped contact-member transmitting portions 23 and two bar-shaped guide members 20.

The four vibrators 8 are fixed to the moving body 19 that retains the optical lens 4. The four contact members 18 are in pressure-contact with the corresponding vibrators 8. The contact members 18 each have the two hole-shaped contact-member transmitting portions 23.

The bar-shaped guide members 20 are inserted in the corresponding contact-member transmitting portions 23. The guide members 20 are fixed to the support member 200 at both ends. The support members 200 are fixed to the part 9 of the lens barrel 1. The contact member 18 is supported by the support member 200 via the moving mechanism 25.

By exciting vibrations showing an elliptical locus over the contact portion between the vibrator 8 and the contact member 18, the vibrator 8 is driven relative to the contact member 18 due to the frictional force between the vibrator 8 and the contact member 18. This driving moves the optical lens 4 on the moving body 19 to which the vibrator 8 is fixed.

Figure 4A:
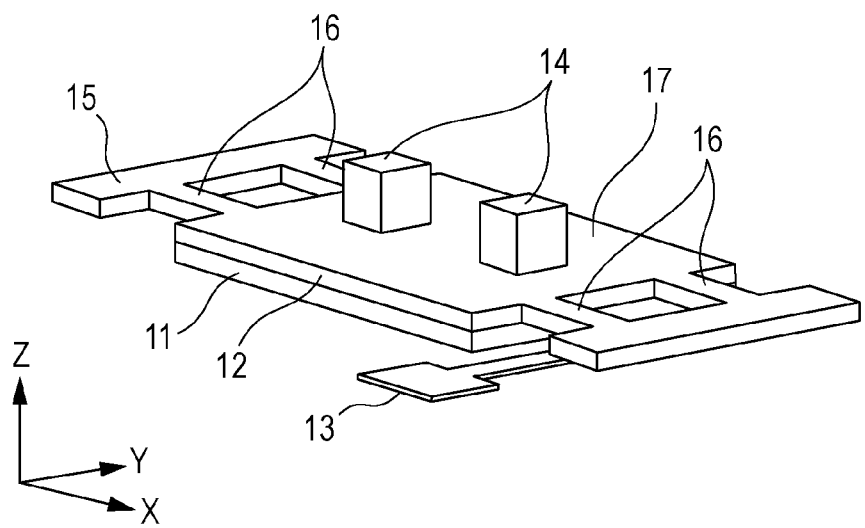
FIG. 4A is a perspective view of a vibrator.
Figure 4B:
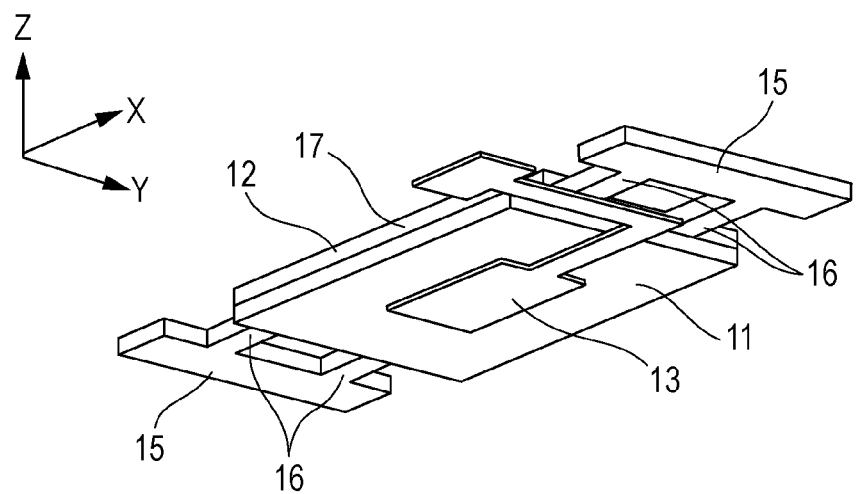
FIG. 4B is a perspective view of the vibrator.

Here, the configuration of the vibrator 8 will be described. FIGS. 4A and 4B are perspective views of the vibrator 8. The vibrator 8 includes a rectangular plate-like piezoelectric ceramic 11, which is an electro-mechanical transducer, a magnetic metal vibration plate 12, and an electrically conductive flexible printed board 13 for supplying electrical energy to the piezoelectric ceramic 11. The vibration plate 12 includes two protrusions 14, two vibrator fixing portions 15, four vibrator support beams 16, and a vibrator base portion 17, which are formed in a single unit.

The vibrator base portion 17 of the vibration plate 12 is bonded to the piezoelectric ceramic 11 with an adhesive. The flexible printed board 13 is bonded to the piezoelectric ceramic 11 with an adhesive.

The piezoelectric ceramic 11 includes an internal electrode stacked in the thickness direction and an external electrode for electrically connecting the internal electrode and wires of the flexible printed board 13. The flexible printed board 13 is electrically connected to the power source 38.

Next, the operation of the vibrator 8 will be described.

Figure 5A:
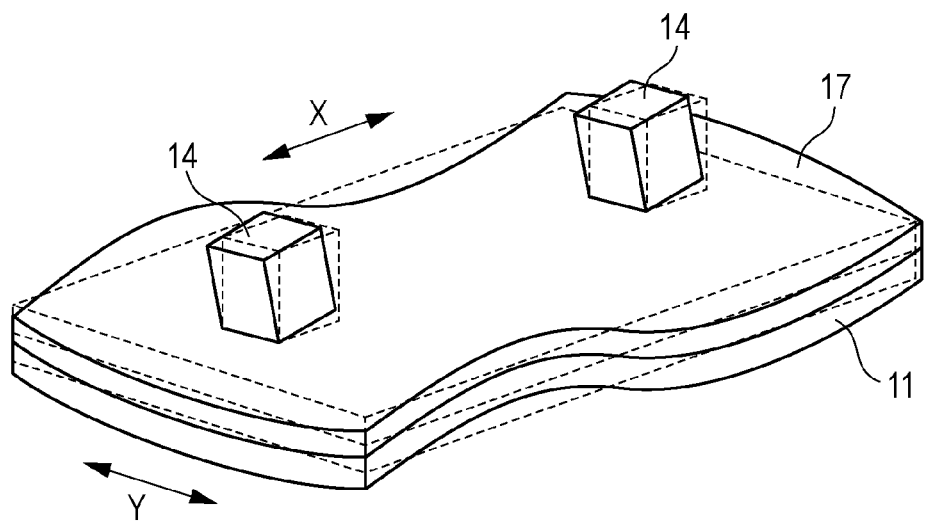
FIG. 5A is a diagram illustrating a vibration mode.
Figure 5B:
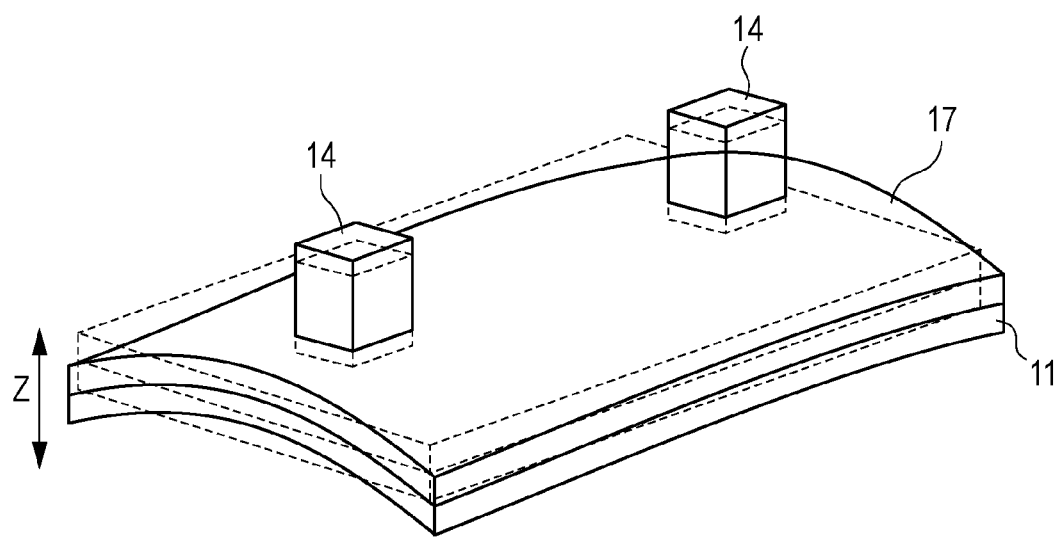
FIG. 5B is a diagram illustrating another vibration mode.

An alternating voltage is applied to the piezoelectric ceramic 11 to excite vibrations in two vibration modes in the vibrator 8. FIGS. 5A and 5B show the two vibration modes.

The vibration mode in FIG. 5A is also referred to as A-mode. The vibration mode in FIG. 5B is also referred to as B-mode.

The vibration mode shown in FIG. 5A is a vibration mode (A-mode) in which the end faces of the protrusions 14 vibrate in the longitudinal direction of the vibrator 8 (also referred to as a feeding direction: the X-direction in FIG. 5A).

The vibration mode shown in FIG. 5B is a vibration mode (B-mode) in which the end faces of the projections 14 vibrate in a direction in which the projections 14 come into contact with the contact member 18 (also referred to as a pushing-up direction: the Z-direction in FIG. 5B).

The alternating voltage is set so as to excite vibrations in the two vibration modes at about 90 degrees in time phase.

Here, "about 90 degrees" means that angles other than exact 90 degrees are allowed in a range in which necessary vibrations are generated.

The same applies to the expression "about" in the present invention.

Thus, the end faces of the projections 14 move in an elliptical locus in a plane parallel to the X-Z plane in the drawings. Setting the phase difference between the vibrations in the two vibration modes to about −90 degrees can reverse the direction of advance of the elliptical locus.

Although a case where vibrations in the two vibration modes are excited in the vibrator 8 to move the end faces of the projections 14 in an elliptical locus has been described, the vibration mode and the form of the vibrator 8 are not limited thereto.

For example, a vibrator including a single projection and having a vibration mode in the Z-direction in the drawing can also be used.

In this case, by tilting the projection relative to a vertical plane into contact with the contact surface of the contact member 18, the vibrator 8 can be driven relative to the contact member 18.

Here, the configuration and the driving operation of the vibration-type driving units 24 will be described.

Figure 6:
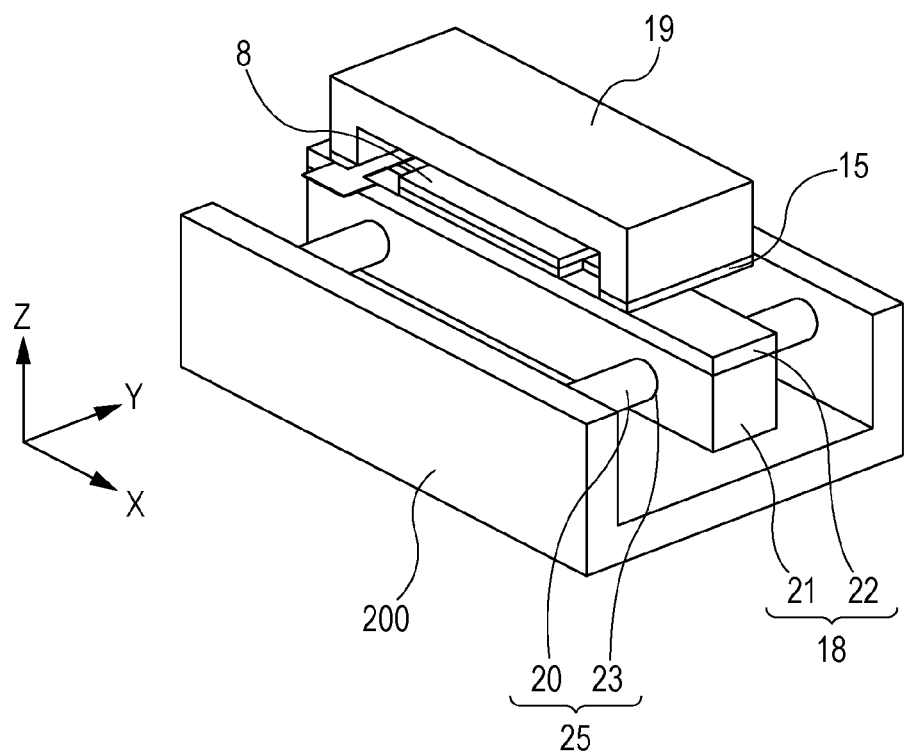
FIG. 6 is a perspective view of a vibration-type driving unit.

FIG. 6 is a perspective view of the vibration-type driving unit 24. The vibration-type driving unit 24 includes the vibrator 8, the contact member 18, the moving mechanism 25, the support member 200, and the moving body 19.

The contact member 18 is constituted by a contact-member main body 21 and an abrasion-resistant member 22 formed of a highly abrasion-resistant material.

The contact-member main body 21 and the abrasion-resistant member 22 are fixed with screws (not shown). The contact member 18 and the vibrator 8 are disposed so that the abrasion-resistant member 22 is in contact with the end faces of the protrusions 14 of the vibrator 8.

The contact-member main body 21 is made of a neodymium magnet, which generates an attracting force between it and the vibration plate 12 having magnetism.

This brings the protrusion 14 and the abrasion-resistant member 22 into pressure-contact with each other. As described above, when vibrations in the two vibration modes are excited in the vibrator 8, a motion in an elliptical locus can be generated at the end faces of the projections 14. This allows the vibrator 8 and the moving body 19 fixed to the vibrator fixing portions 15 of the vibrator 8 can be driven in the X-direction in FIG. 6 relative to the support member 200.

Here, although an example in which the vibration plate 12 is formed of a material having magnetism, and the attracting force between the vibration plate 12 and the contact-member main body 21 made of a neodymium magnet causes the projections 14 and the abrasion-resistant member 22 to come into pressure-contact with each other is shown, the vibration-type driving unit 24 of the present invention is not limited thereto. For example, the vibration plate 12 and the contact-member main body 21 may be formed of nonmagnetic materials. In this case, using a pressure member, such as a coil spring, allows the projections 14 and the abrasion-resistant member 22 to be brought into pressure-contact with each other.

Next, the configuration of the moving mechanism 25 will be described.

The driving direction (the first direction) in which the vibrator 8 drives the contact member 18 is the X-direction (the first direction) in FIG. 6. The Y-direction (the second direction or the deflecting direction) intersects the X-direction (the first direction) at right angles.

The contact-member main body 21 of the contact member 18 has round-hole-shaped openings whose axis extends in the Y-direction (the second direction) as the contact-member transmitting portion 23.

The inner circumferential surfaces of the openings are subjected to hard plating to improve abrasion resistance. The guide members 20 made of an abrasion-resistant material are disposed so as to pass through the openings (contact-member transmitting portions 23).

The guide members 20 are fixed to the support member 200 and have a round-bar shape whose longitudinal direction (axis direction) extends in the Y-direction (the second direction).

The inner circumferential surfaces of the round holes of the contact-member transmitting portions 23 and the outer circumferential surfaces of the round-bar-shaped guide members 20 are surfaces that move relative to each other in the Y-direction (the second direction or the deflecting direction) in FIG. 6.

These surfaces are coated with lubricant so as to reduce a load during sliding. The above configuration of the guide members 20 and the contact-member transmitting portions 23, serving as the moving mechanism 25, allows the contact member 18 and the support member 200 to move relative to each other in the Y-direction (the second direction, or the deflecting direction) in FIG. 6 under a small load. The moving mechanism 25 is disposed between the support member 200 and the moving body 19. This allows the moving member 19 to be moved in the Y-direction (the second direction or the deflecting direction) relative to the support member 200 under a small load.

The moving mechanism 25 can receive a reaction force in the driving direction (the first direction) when the vibration-type driving units 24 is driven to move the vibrator 8 and the moving body 19 relative to the support member 200.

Here, the advantages of minimization of the first embodiment will be described.

The vibrators of many linear vibration-type driving units, including the vibrators 8 of the first embodiment, has protrusions whose ends serve as contacts with the contact member 18.

This is provided for the purpose of increasing the displacement of desired deformed portions of the surface of the vibrator and transmitting the deformation to the contact member. For the function of the vibration-type driving unit, it is absolutely necessary that the end faces of the protrusions of the vibrator and the contact member be in contact even if the vibrator and the contact member move relative to each other by a fixed amount of operation.

This necessarily increases the length (size) of the contact member in the driving direction as compared with that of the vibrator.

Moving the vibrator whose size (length) in the driving direction is small rather than moving the contact member whose size (length) in the driving direction can reduce a space for preventing interference with another component during operation, thereby decreasing a space for the vibration-type driving unit to occupy.

Next, the operation of the vibration-type driving units 24 in the two-dimensional driving apparatus will be described.

Figure 7:
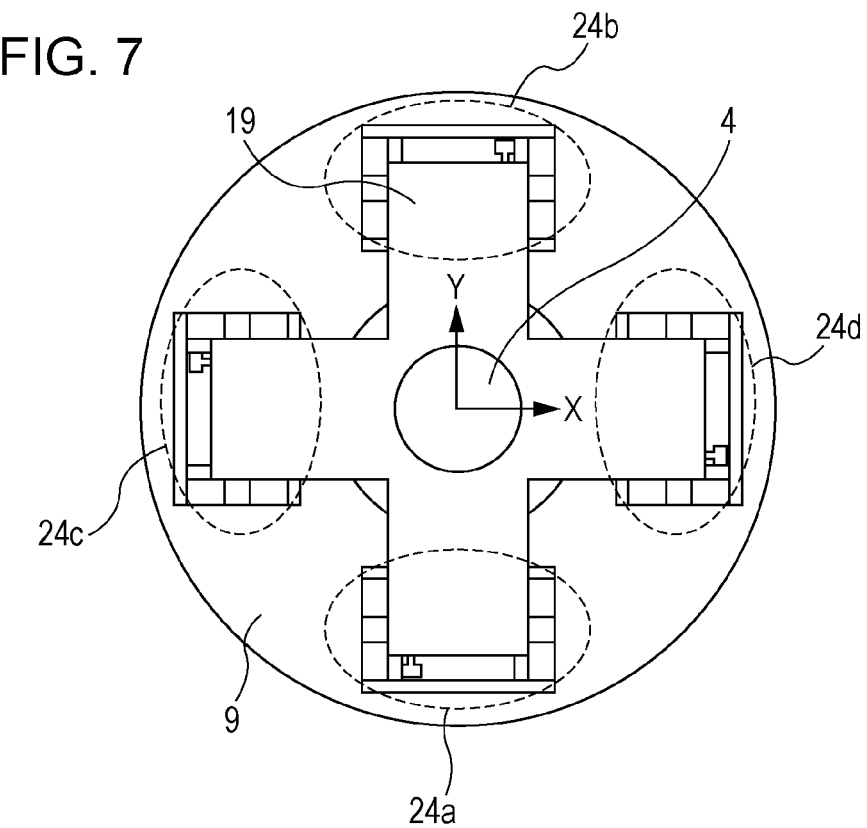
FIG. 7 is a front view of the image-blur correction apparatus.

FIG. 7 is a front view of the image-blur correction apparatus 3. The origin of the coordinate system in FIG. 7 is located at the center of the circumference of the lens barrel 1.

The driving direction (the first direction) of the vibration-type driving units 24a and 24b is the X-direction in FIG. 7, and the deflecting direction (the second direction) by means of the moving mechanisms 25 is the Y-direction.

The driving direction (the first direction) of the vibration-type driving units 24c and 24d is the Y-direction in FIG. 7, and the deflecting direction (the second direction) by means of the moving mechanism 25 is the X-direction.

Figure 8:
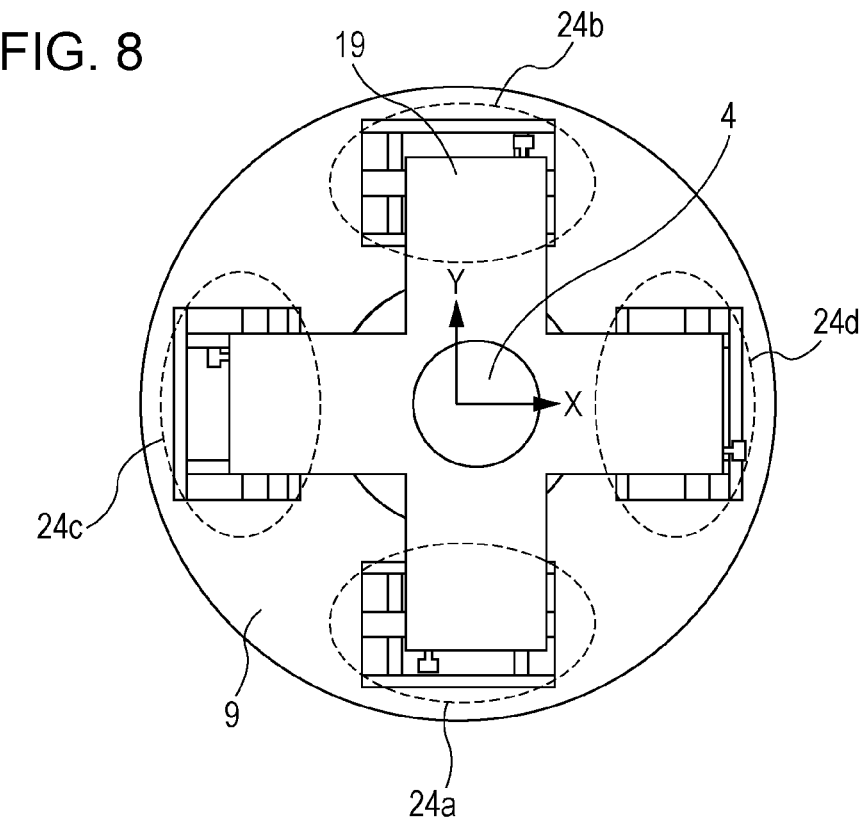
FIG. 8 is a front view of the image-blur correction apparatus, which moves a moving body retaining an optical lens in a positive X-direction.

Driving the vibration-type driving units 24a and 24b allows the moving body 19, which retains the optical lens 4, to be moved in a positive X-direction, as shown in FIG. 8.

Since the driving direction (the first direction) of the vibration-type driving units 24c and 24d is Y-direction, the vibration-type driving units 24c and 24d do not contribute to the movement of the moving body 19.

At that time, the moving body 19 can be moved in the X-direction (the second direction) relative to the support members 200 of the vibration-type driving units 24c and 24d by the moving mechanisms 25, and thus, a load that hinders movement of the movable body 19 in the X-direction is not generated.

Figure 9:
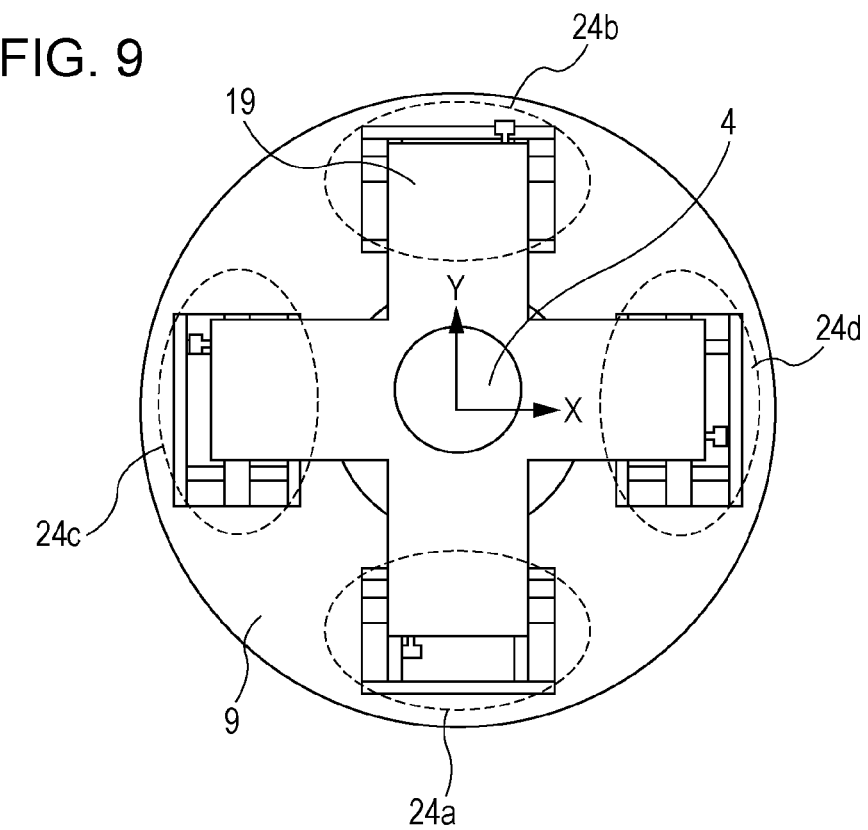
FIG. 9 is a front view of the image-blur correction apparatus, which moves the moving body in a positive Y-direction.

When the vibration-type driving units 24c and 24d are driven, the moving body 19 can be moved in a positive Y-direction, as shown in FIG. 9.

Accordingly, the vibration-type driving units 24a and 24b do not generate a load that hinders movement of the movable body 19 in the Y-direction by means of the moving mechanisms 25 on the basis of the above principle.

Figure 10:
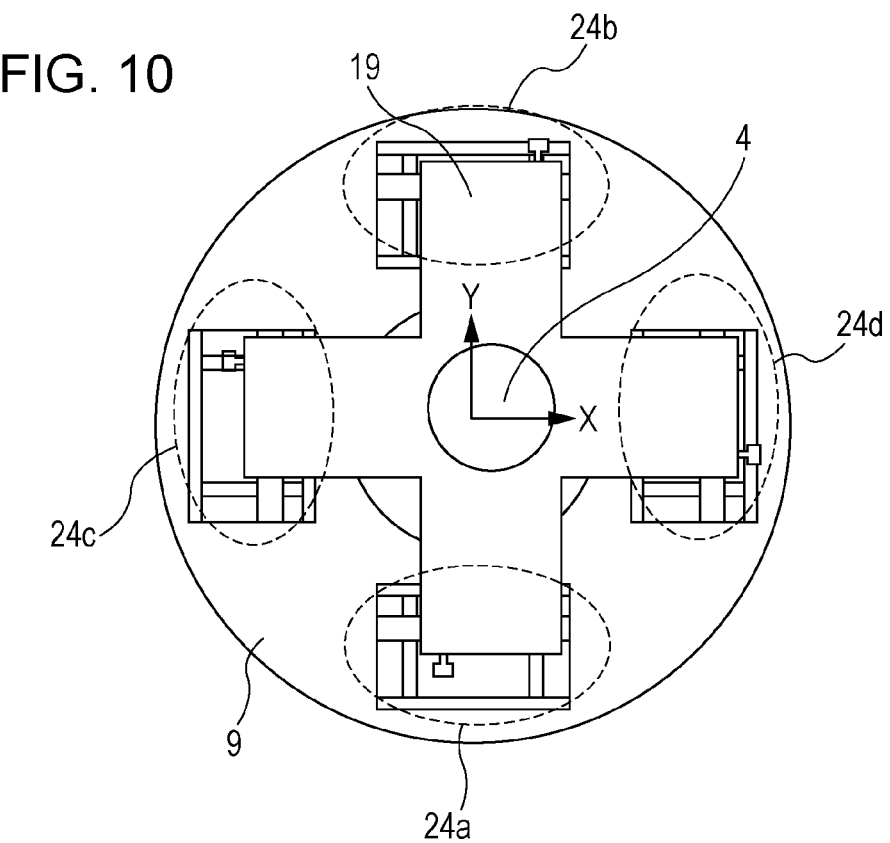
FIG. 10 is a front view of the image-blur correction apparatus, which moves the moving body by driving all the vibration-type driving units between the X- and Y-directions.

FIG. 10 a diagram showing a state in which all the vibration-type driving units 24 (24a, 24b, 24c, and 24d) are driven to move the moving body 19 between the X- and Y-directions.

In this case, the moving mechanisms 25 of all the vibration-type driving units (24a, 24b, 24c, and 24d) move relative to each other, and movement of the moving body 19 in both the X-direction and the Y-direction is not hindered by the vibration-type driving units 24.

Furthermore, the configuration in which the contact-member transmitting portions 23 have flexibility in rotation about the Z-axis allows the moving body 19 to move about the Z-axis perpendicular to the X-axis and the Y-axis. This can be achieved by, for example, driving the vibration-type driving unit 24a in a positive X-direction, driving the vibration-type driving unit 24b in a negative X-direction, driving the vibration-type driving unit 24c in a negative Y-direction, and driving the vibration-type driving unit 24d in a positive Y-direction.

By adjusting the amount of driving of the vibration-type driving units 24 (24a, 24b, 24c, and 24d), the moving body 19 can be moved to any positions in the X-Y plane. Rotational movement in the plane of the drawing can be added thereto.

Here, the advantages of stabilization of output in an embodiment of the present invention will be described.

The contact member 18 in contact with the vibrator 8 has innumerable resonant modes, whose resonant frequencies also vary.

When the frequency of force that the contact member 18 receives and the resonant frequency of a resonant mode match substantially, unnecessary significant vibrations are generated in the contact member 18 due to a resonant phenomenon.

The vibrations cause the portion of the contact member 18 in contact with the vibrator 8 to vibrate significantly, thus causing instability of the contact with the vibrator 8.

This can sometimes cause instability of the output of the vibration-type driving units 24. On the other hand, the vibrator 8 also has innumerable resonant modes, and unnecessary vibrations can be generated also in the vibrator 8, as in the contact member 18.

However, the vibrator 8 vibrates greatly in a given vibration mode due to a predetermined alternating voltage. Thus, even if unnecessary vibrations are generated in the vibrator 8, its adverse influence is smaller than a case where unnecessary vibrations are generated in the contact member 18.

In other words, to maintain a good contact between the contact member 18 and the vibrator 8, it is important to reduce unnecessary vibrations generated in the contact member 18, which is in contact with the vibrator 8.

If a component in contact with the vibrator 8 moves, exciting forces of varying frequencies are generated due to variations in contact state caused by ununiformity in shape and size, surface roughness, and so on of the sliding portion.

This exciting forces increase the tendency to generate unnecessary vibrations in the component in contact with the vibrator 8. A contact member (a driven member), which is a component in contact with the vibrator in the related art, is configured to move in two directions, that is, the driving direction (the first direction) and the deflecting direction (the second direction) perpendicular to the driving direction.

In contrast, in the first embodiment of the present invention, the contact member 18, which is a component in contact with the vibrator 8, does not move in the driving direction (the first direction) but only in one direction, that is, the deflecting direction (the second direction). The component in contact with the vibrator moves in two directions in the related art, whereas the component moves only in one direction in the present invention. This can reduce not only the sliding portion but also the sliding direction of the component in contact with the vibrator.

This can reduce the causes of the force that the component in contact with the vibrator receives, thus reducing the causes of unnecessary vibrations to achieve stabilization of the output of the vibration-type driving unit.

In other words, a vibration-type driving unit in which the occupied space and unnecessary vibrations can be reduced, and the output loss can be reduced can be achieved.

Furthermore, providing the vibration-type driving unit allows a two-dimensional driving apparatus, an image-blur correction apparatus, an interchangeable lens, and an image capturing apparatus in which the occupied space and unnecessary vibrations can be reduced, and the output loss can be reduced to be achieved.

Although the first embodiment is configured such that the four vibration-type driving units 24 are disposed such that the driving directions (the first directions) intersect at right angles, the present invention is not limited thereto.

Disposing the vibration-type driving units 24 such that the driving directions intersect allows two-dimensional movement of the moving body 19, as in the first embodiment. The advantages of the moving mechanism 25 of this disposition are the same as above.

In the first embodiment, the two-dimensional movement of the moving body 19 is achieved only with the vibration-type driving units 24; alternatively, part thereof may be replaced with a driving unit that uses no contact, such as a voice coil motor.

For example, disposing a voice coil motor and the vibration-type driving units 24 such that the driving directions differ allows the two-dimensional movement of the moving body 19.

[Second Embodiment]

Next, a second embodiment will be described. The difference between the second embodiment and the first embodiment is the configuration of the moving mechanism 25.

The configuration of the difference from the first embodiment will be described hereinbelow.

Figure 11:
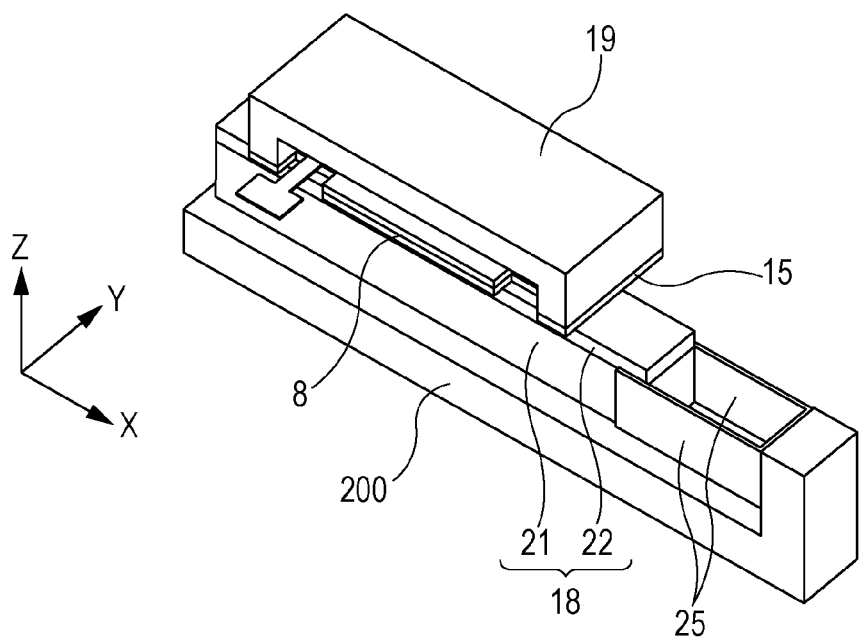
FIG. 11 is a perspective view of the configuration of a vibration-type driving unit according to a second embodiment.

FIG. 11 is a perspective view of a vibration-type driving unit 24 used in an image capturing apparatus of the second embodiment.

The X-direction in FIG. 11 is the driving direction (the first direction) of the vibration-type driving unit 24.

The Y-direction is the deflecting direction (the second direction) in which the moving body 19 and the support member 200 can be moved relative to each other by the moving mechanism 25.

The moving mechanism 25 is formed of two rectangular thin plate-like elastic members made of stainless steel. The thickness direction thereof is the Y-direction (the deflecting direction or the second direction).

One end is bent at a right angle by press working and is fixed to the support member 200. The other end is fixed to the contact member 18. The two elastic members are placed side by side in the Y-direction (the deflecting direction or the second direction).

Since the thin thickness direction of the moving mechanism 25 is the Y-direction (the deflecting direction or the second direction), the flexural rigidity in the Y-direction (the deflecting direction or the second direction) is small.

When the moving body 19 is moved in the Y-direction by other vibration-type driving units 24, the moving mechanism 25 is deformed in the Y-direction (the deflecting direction or the second direction).

This allows the contact member 18 to move in the Y-direction (the deflecting direction or the second direction) relative to the support member 200.

Accordingly, the moving body 19 can move in the Y-direction (the deflecting direction or the second direction) relative to the support member 200.

The moving mechanism 25 is a single component and can be formed by press working, thus offering the advantages that it has a simple configuration and can be manufactured at low cost.

The dimension (length) of the moving mechanism 25 in the X-direction (the driving direction or the first direction) is larger than the dimension (length) in the thickness direction (the Y-direction, the deflecting direction, or the second direction).

This makes the rigidity in the X-direction (the driving direction or the first direction) higher than that in the Y-direction (the deflecting direction or the second direction).

Since the rigidity in the X-direction (the driving direction or the first direction) is high, deflection and force can be transmitted in this direction.

Furthermore, the moving mechanism 25 has no clearance in this direction, thus providing high accuracy in moving the moving body 19.

The thickness direction of the two plate-like elastic members of the moving mechanism 25 is the Y-direction (the deflecting direction or the second direction), and the two plate-like elastic members are disposed side by side in the Y-direction (the deflecting direction or the second direction).

With the configuration of the second embodiment, the moving mechanism 25 functions as an elastic ring whose main deforming direction is the Y-direction (the deflecting direction or the second direction).

When the moving body 19 moves in the Y-direction (the deflecting direction or the second direction), the force about the Z-axis that the contact member 18 receives is extremely small.

This stabilizes the relative position of the vibrator 8 and the contact member 18 about the Z-axis, thus offering the effect leading to stabilization of the performance, as in the first embodiment.

The second embodiment also offers the same advantages as in the first embodiment.

[Third Embodiment]

Next, a third embodiment will be described. The difference between the third embodiment and the first embodiment is the configuration of the moving mechanism 25.

The configuration of the difference from the first embodiment will be described hereinbelow.

Figure 12A:
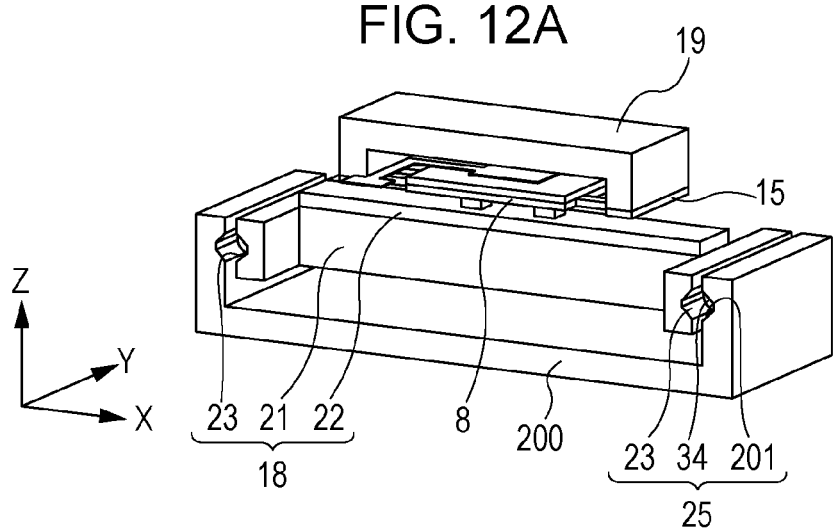
FIG. 12A is a perspective view of the configuration of a vibration-type driving unit according to a third embodiment.
Figure 12B:
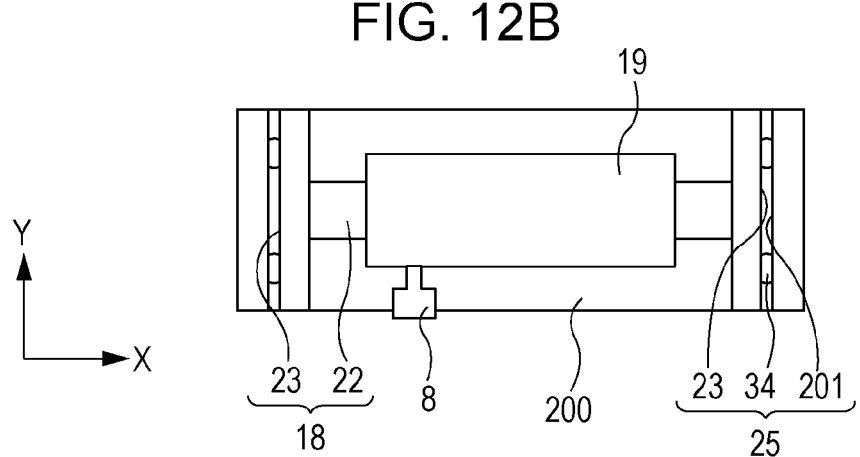
FIG. 12B is a top view of the vibration-type driving unit.

FIG. 12A is a perspective view of the configuration of a vibration-type driving unit 24 of the third embodiment. FIG. 12B is a top view, and FIG. 12C is a side view.

Figure 12C:
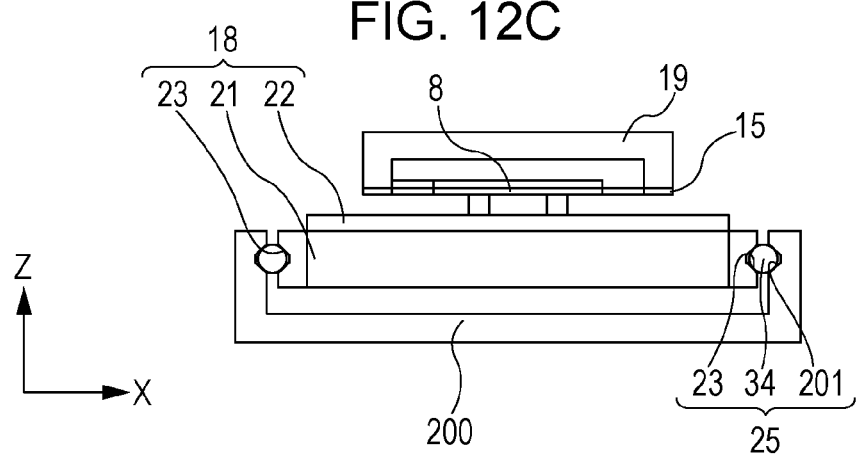
FIG. 12C is a side view of the vibration-type driving unit.

The X-direction in FIGS. 12A to 12C is the driving direction (the first direction) of the vibration-type driving unit 24. The Y-direction is the deflecting direction (the second direction) in which the moving body 19 and the support member 200 can be moved relative to each other by the moving mechanism 25.

The contact member 18 includes the abrasion-resistant member 22, the contact-member main body 21 made of a neodymium magnet, and the contact-member transmitting portions 23.

The moving mechanism 25 includes the contact-member transmitting portion 23, a ceramic ball 34 having a rollable curved shape (a curved portion), and a support-member transmitting portion 201 of the support member 200.

Both the contact-member transmitting portion 23 and the support-member transmitting portion 201 have a trapezoidal shape in an X-Z cross section and each have a groove extending in the Y-direction (the deflecting direction or the second direction).

The ball 34 is disposed between the grooves. The moving mechanism 25 is provided at both ends of the contact member 18 in the X-direction (the driving direction or the first direction).

The support member 200 is made of a ferromagnetic material, thus applying an attracting force between it and the contact member 18 made of a neodymium magnet.

This causes a preload in the Z-direction in FIGS. 12A and 12C between the contact member 18 and the support member 200. This preload brings the slope of the groove in the contact-member transmitting portion 23 and the ball 34 into pressure-contact with each other.

Likewise, the slope of the groove in the support-member transmitting portion 201 and the ball 34 come into pressure-contact with each other.

With the configuration of the third embodiment, the ball 34 can roll between the grooves in the contact-member transmitting portion 23 and the support-member transmitting portion 201 in the Y-direction (the deflecting direction or the second direction).

This allows the contact member 18 to move in the Y-direction (the deflecting direction or the second direction) relative to the support member 200.

Accordingly, the moving body 19 can move in the Y-direction (the deflecting direction or the second direction) relative to the support member 200.

The resistance when the ball rolls is remarkably small, and thus, so that the load on the moving mechanism 25 during relative movement is remarkably small.

Furthermore, since the ball is always in pressure-contact, the moving mechanism 25 has no clearance. On the other hand, the contact member 18 cannot move in the X-direction (the driving direction or the first direction) relative to the support member 200, and displacement and force in the X-direction can be transmitted to the moving body 19. The moving mechanism 25 has no clearance also in this direction.

The contact-member transmitting portion 23 is manufactured as follows: a groove is formed in a thin plate-like stainless steel material by forging, which is a kind of press working; thereafter, the surface thereof is subjected to nitriding to form an abrasion-resistant member; and the contact-member transmitting portion 23 is fixed to the main body of the contact member 18 by bonding or the like.

The support member 200 is manufactured as follows: grooves are formed in a thin plate-like stainless steel material by forging, which is a kind of press working; thereafter, both ends in the X-direction are bent by press working; and thereafter, the surface is subjected to nitriding to form an abrasion-resistant member. Since the press working is a low-cost manufacturing method, the contact-member transmitting portion 23 and the support member 200 can also be manufactured at low cost.

The third embodiment can also provide the same advantages as in the first embodiment.

[Fourth Embodiment]

Next, a fourth embodiment will be described. The difference between the fourth embodiment and the third embodiment is that a limiting mechanism 26 that limits the relative displacement in the Y-direction (the deflecting direction or the second direction) of the vibrator 8 and the contact member 18 of the vibration-type driving unit 24 is added.

The configuration of the difference between the fourth embodiment and the third embodiment will be described hereinbelow.

Figure 13A:
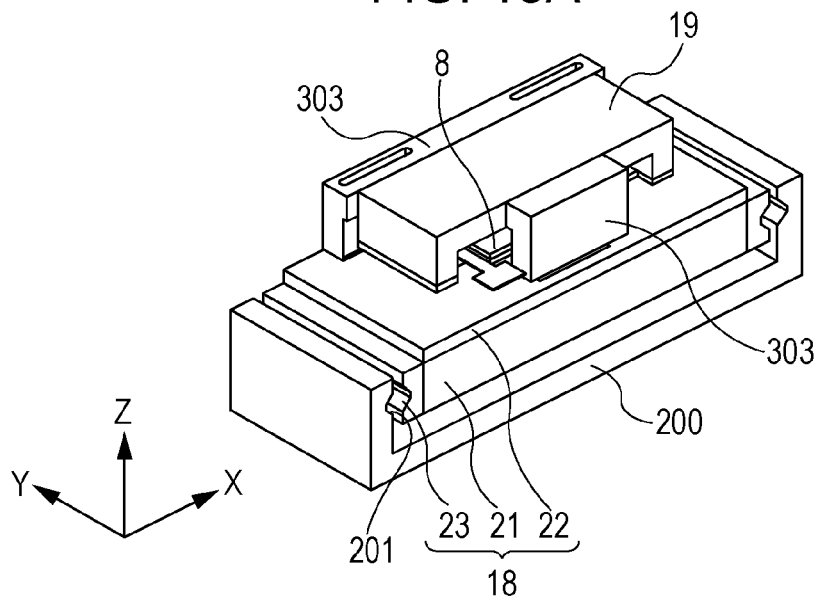
FIG. 13A is a perspective view of the configuration of a vibration-type driving unit according to a fourth embodiment.

FIG. 13A is a perspective view of an example configuration of a vibration-type driving unit 24 of the fourth embodiment.

Figure 13B:
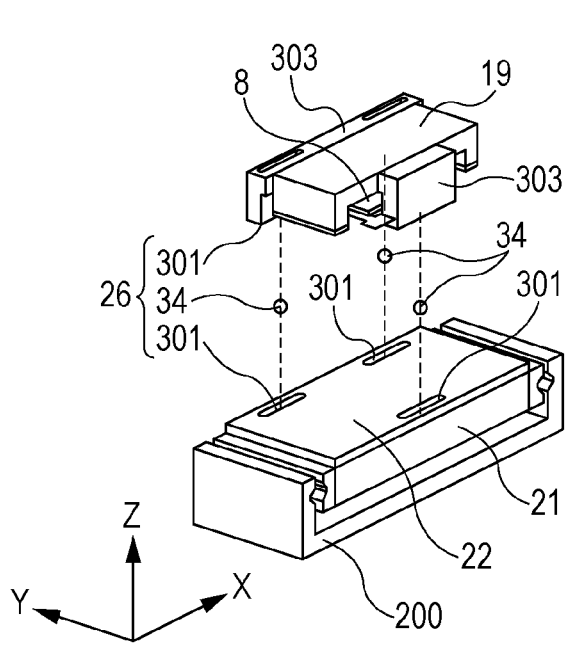
FIG. 13B is an exploded perspective view of the vibration-type driving unit.
Figure 13C:
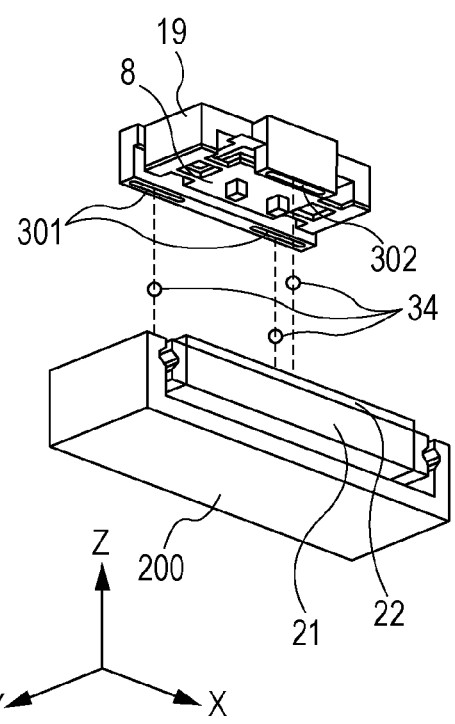
FIG. 13C is an exploded perspective view of the vibration-type driving unit.

FIGS. 13B and 13C are exploded perspective views of the limiting mechanism 26 in which the components are exploded in the Z-direction so that the configuration thereof can easily be understood.

The abrasion-resistant member 22 of the contact member 18 is provided with three trapezoidal grooves 301, which are trapezoidal in a Y-Z cross section and extend in the X-direction (the driving direction or the first direction).

Moving-body groove members 303 are provided at both sides of the vibrator 8 in the Y-direction and are fixed to the moving body 19.

One of the moving-body groove members 303 has two trapezoidal grooves 301 which are trapezoidal in a Y-Z cross section and which extend in the X-direction (the driving direction or the first direction).

The other of the moving-body groove members 303 has a square groove 302 which is rectangular in a Y-Z cross section and which extends in the X-direction (the driving direction or the first direction).

Two of three balls 34 are disposed in contact with the abrasion-resistant member 22 and the slopes of the trapezoids of the trapezoidal grooves 301 of the moving-body groove member 303. These constitute the limiting mechanism 26 that limits the relative movement of the vibrator 8, the moving body 19, and the contact member 18 in the Y-direction (the deflecting direction or the second direction).

In contrast, the relative movement in the X-direction (the first direction) is not limited. The remaining ball 34 is disposed in contact with the slope of the trapezoid of the trapezoidal groove 301 in the abrasion-resistant member 22 and the lower surface of the square groove 302 in the moving-body groove member 303.

The three balls 34 are pressed by a force that presses the vibrator 8 and the contact member 18. With this configuration, a direction in which the vibrator 8 and the contact member 18 can move relative to each other is only the X-direction (the driving direction or the first direction).

Here, the advantage of the limiting mechanism 26 will be described.

If the driving direction (the first direction) of the vibrator 8 is shifted to have an angle in the X-direction due to an error in the mounting position or the like, the vibrator 8 is acted upon by a force in the Y-direction (the second direction) due to the driving of the vibrator 8.

If this causes the vibrator 8 to move in the Y-direction (the second direction), the vibrator 8 and the contact member 18 cannot be in contact in a predetermined range, thus making the contact unstable. An excessively large shift hinders the vibrator 8 and the contact member 18 from coming into contact with each other.

However, since the fourth embodiment is provided with the limiting mechanism 26 described above, the vibrator 8 and the contact member 18 can always be in contact in a predetermined range.

Furthermore, the gap between the vibrator 8 and the contact member 18 in the Y-direction (the second direction) can be caused not by the shift in the driving direction but by an external impact or the like. Also in this case, the limiting mechanism 26 allows the vibrator 8 and the contact member 18 to be kept contact in a predetermined range.

Also the fourth embodiment can offer the same advantages as in the first embodiment.

[Fifth Embodiment]

Next, a fifth embodiment will be described. The difference between the fifth embodiment and the fourth embodiment is the configuration of the moving body 19 of the vibration-type driving unit 24.

The configuration of the difference from the fourth embodiment will be described hereinbelow.

Figure 14:
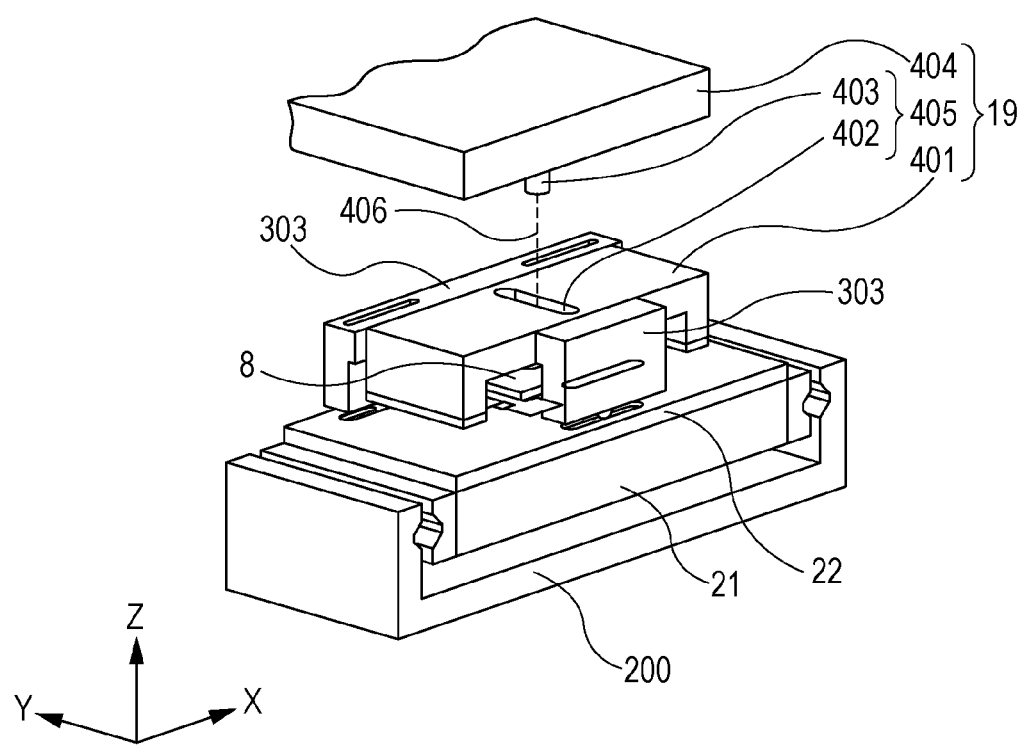
FIG. 14 is a perspective view of the configuration of a vibration-type driving unit according to a fifth embodiment.

FIG. 14 is a perspective view of the configuration of a vibration-type driving unit 24 of the fifth embodiment.

The X-direction is the driving direction (the first direction) of the vibration-type driving unit 24.

The Y-direction is the deflecting direction (the second direction). The Z-direction is a direction in which the vibrator 8 and the contact member 18 are in contact with each other. The components are exploded in the Z-direction in FIG. 14.

The moving body 19 includes a vibrator fixing portion 401, a rotation mechanism 405 serving as an output transmission mechanism, and a moving-body main portion 404. The vibrator 8 is fixed to the vibrator fixing portion 401. The vibrator fixing portion 401 has a guide (for example, a long hole 402) whose longitudinal direction is the Y-direction (the deflecting direction or the second direction) and whose depth direction is the Z-direction.

The optical lens 4 is fixed to the moving-body main portion 404. The moving-body main portion 404 includes a bar member (for example, a round bar 403) whose axial direction is the Z-direction. The long hole 402 and the round bar 403 each have hard film and lubricant on the individual surfaces thereof. The round bar 403 is inserted in the long hole 402 to form the rotation mechanism 405.

The central axis of the round bar 403 serves as the rotation axis (first axis) 406 of the rotation mechanism 405.

The rotation axis (first axis) 406 is parallel to the Z-direction in FIG. 14. The rotation mechanism 405 allows the moving-body main portion 404 and the vibrator fixing portion 401 to rotate about the rotation axis 406 (the first axis). Force and displacement can be transmitted in the X-direction, which is the driving direction (the first direction).

The rotation mechanism 405 also serves as a moving mechanism in the Y-direction (the deflecting direction or the second direction). In other words, the guide and the bar member also function as a moving mechanism in the Y-direction (the deflecting direction or the second direction).

Here, the rotating operation of the two-dimensional driving apparatus using the rotation mechanism 405 will be described.

Figure 15:
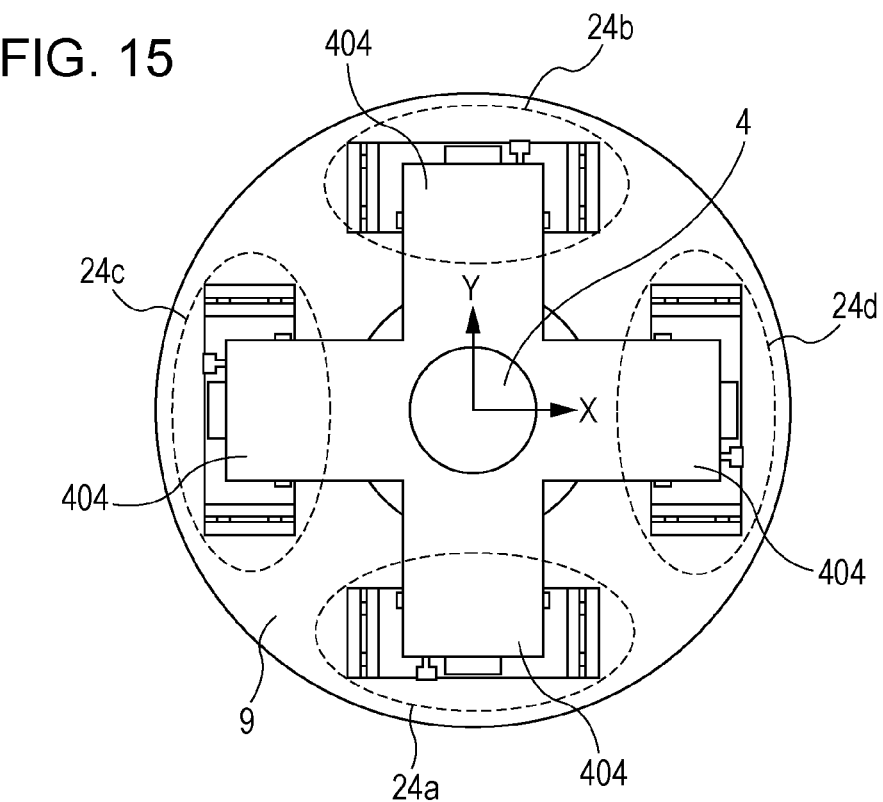
FIG. 15 is a front view of an image-blur correction apparatus of the fifth embodiment.

FIG. 15 is a front view of an image-blur correction apparatus.

The origin of the coordinate system in FIG. 15 coincides with the center position of the circumference of the lens barrel 1. A driving force in a negative X-direction is generated in the vibration-type driving units 24a.

A driving force in a positive X-direction is generated in the vibration-type driving unit 24b, a driving force in a positive Y-direction is generated in the vibration-type driving unit 24c, and a driving force in a negative Y-direction is generated in the vibration-type driving unit 24d.

Figure 16:
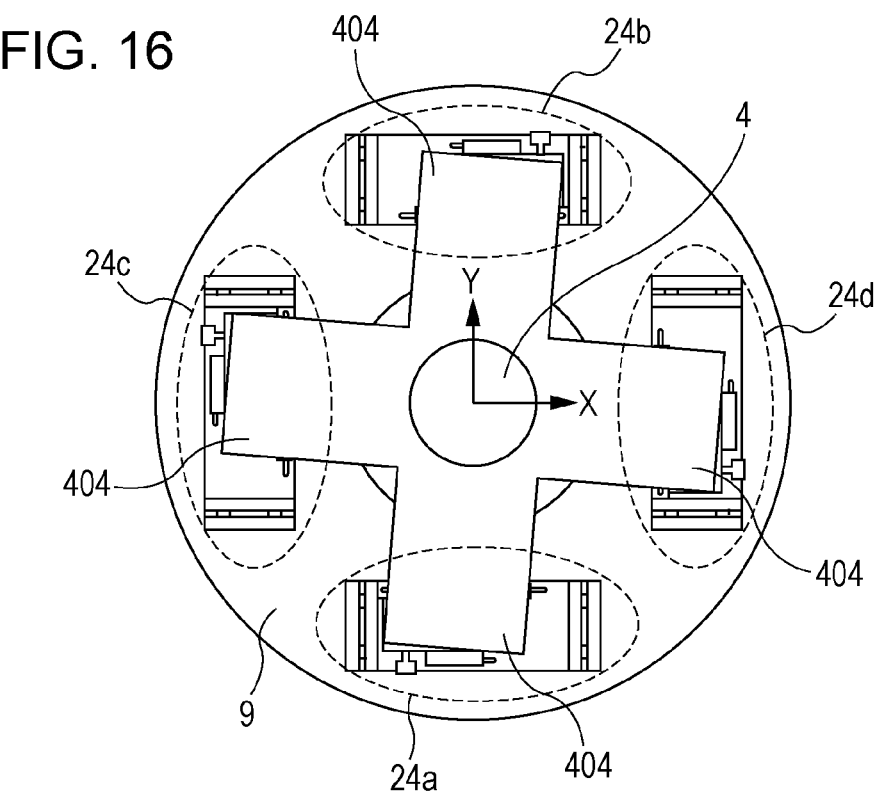
FIG. 16 is a front view of the image-blur correction apparatus in operation.

In other words, a counterclockwise driving force in the plane of the drawing is generated. This operation allows the moving-body main portion 404 to be moved clockwise, as shown in FIG. 16.

Since the relative rotation of the moving-body main portion 404 and the vibrator fixing portion 401 is enabled by the rotation mechanism 405, the vibrator 8 fixed to the vibrator fixing portion 401 and the contact member 18 can be held in predetermined positional relationship by the limiting mechanism 26 without substantially receiving the rotating force. Without the rotation mechanism 405, the relative rotation of the vibrator 8 and the contact member 18 is limited by the limiting mechanism 26, and thus, the amount of rotation of the moving-body main portion 404 is decreased.

The configuration of the rotation mechanism 405 is not limited to the fifth embodiment; for example, a rotation mechanism using a bearing and any other mechanisms that allow the relative rotation of components corresponding to the moving-body main portion 404 and the vibrator fixing portion 401 are possible.

The rotation mechanism may be disposed between a component corresponding to the support member 200 and the contact member 18 or at another position.

Although the fifth embodiment has been described using the round bar 403 as an example of a bar member, and the long hole 402 as an example of a guide, the present invention is not limited thereto. For example, a round bar may be used as the bar member, and a slit in the moving body 19 may be used as the guide.

Also in the fifth embodiment, the component in contact with the vibrator 8 moves only in one direction as in the first to fourth embodiments. This can reduce not only the sliding portion but also the sliding direction of the component in contact with the vibrator 8.

This can reduce the causes of the force that the component in contact with the vibrator 8 receives, thus reducing the causes of unnecessary vibrations to achieve stabilization of the output of the vibration-type driving units 24.

In other words, a vibration-type driving unit in which the occupied space and unnecessary vibrations can be reduced, and the output loss can be reduced can be achieved.

Furthermore, providing the vibration-type driving units 24 allows a two-dimensional driving apparatus, an image-blur correction apparatus, an interchangeable lens, and an image capturing apparatus in which the occupied space and unnecessary vibrations can be reduced, and the output loss can be reduced to be achieved.

[Sixth Embodiment]

Next, a sixth embodiment will be described. The difference between the sixth embodiment and the fifth embodiment will be described hereinbelow.

Figure 17:
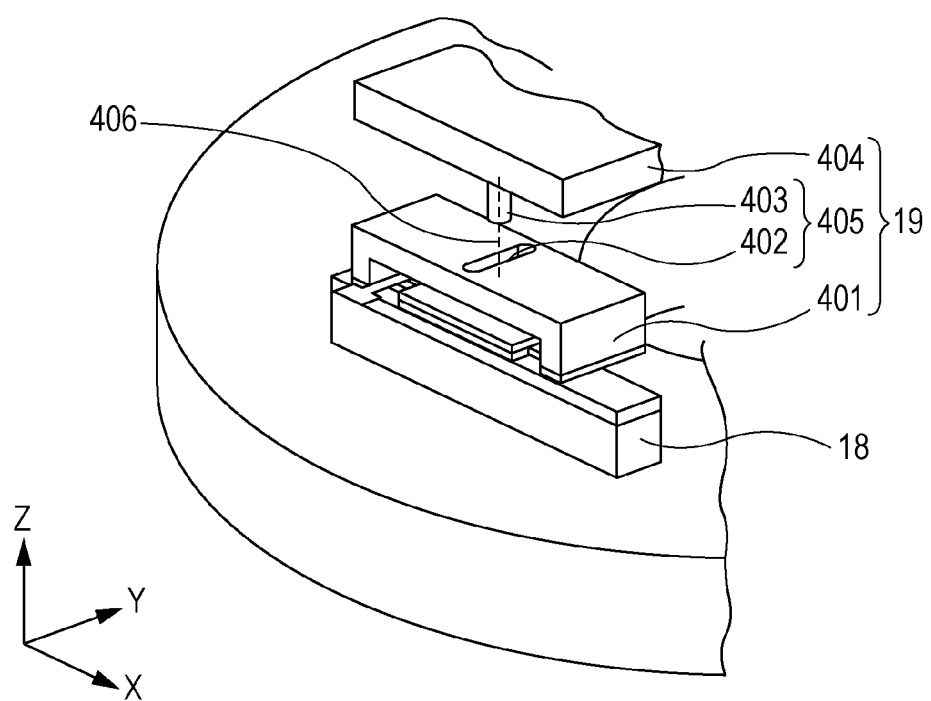
FIG. 17 is a perspective view of the configuration of a vibration-type driving unit according to a sixth embodiment.

FIG. 17 is a perspective view of an example configuration of a vibration-type driving unit 24 of a sixth embodiment. In FIG. 17, the X-direction is the driving direction (the first direction), the Y-direction is the deflecting direction (the second direction), and the Z-direction is a direction in which the vibrator 8 and the contact member 18 are in contact.

The contact member 18 serves also as the connection between the support member 200 and the lens barrel 1.

This eliminates the support member 200. Furthermore, the moving mechanism 25 disposed between the support member 200 and the contact member 18 is eliminated.

The rotation mechanism 405 of the moving body 19 serves also as the moving mechanism in the Y-direction (the deflecting direction or the second direction). The limiting mechanism 26 is also eliminated.

The sixth embodiment can reduce not only the sliding portion but also the sliding direction of the component in contact with the vibrator 8.

This can reduce the causes of the force that the component in contact with the vibrator 8 receives, thus reducing the causes of unnecessary vibrations to achieve stabilization of the output of the vibration-type driving unit 24.

In other words, a vibration-type driving unit in which the occupied space and unnecessary vibrations can be reduced, and the output loss can be reduced can be achieved.

Furthermore, providing the above vibration-type driving unit 24 allows a two-dimensional driving apparatus, an image-blur correction apparatus, an interchangeable lens, and an image capturing apparatus in which the occupied space and unnecessary vibrations can be reduced, and the output loss can be reduced to be achieved.

Here, the function and the advantages of the moving mechanism with the above configuration of the sixth embodiment will be described. In the sixth embodiment, the rotation mechanism 405 serves as a mechanism for moving the contact member 18 corresponding to the support member and the moving-body main portion 404 relative to each other in the Y-direction (the deflecting direction or the second direction).

As described in the fifth embodiment, the rotation mechanism 405 has the function of a moving mechanism in the Y-direction (the deflecting direction or the second direction).

The rotation mechanism 405 is disposed between the vibrator 8 and the moving-body main portion 404. When the moving-body main portion 404 moves in the Y-direction (the deflecting direction or the second direction) relative to the part 9 of the lens barrel 1, the contact member 18 and the vibrator 8 are not moved in the Y-direction (the deflecting direction or the second direction).

This offers the following four advantages in addition to those in the above embodiments.

The first advantage is that the mass to be moved with the movement of the optical lens 4 can be reduced.

When the moving-body main portion 404 is moved in the Y-direction by the vibration-type driving unit 24 (not shown), the contact member 18 and the vibrator 8 of the vibration-type driving unit in FIG. 17 are not moved in the Y-direction.

In other words, since there is no need to move the contact member 18, the vibrator 8, and components fixed thereto, the output of the two-dimensional driving apparatus can be increased.

The second advantage is miniaturization of the apparatus. If the contact member 18, the vibrator 8, and components fixed thereto move in the Y-direction (the deflecting direction or the second direction), it is necessary to keep a space in which they move to prevent spatial interference with the other components.

However, since they do not move in the sixth embodiment, there is no need to keep the space in the Y-direction, thus allowing miniaturization of the apparatus.

The third advantage is that the anti-damage reliability of the electrically conductive member (for example, a flexible printed board) that supplies electrical energy to the vibrator 8 is improved.

In the sixth embodiment, the vibrator 8 moves in the X-direction, which is the driving direction (the first direction), not in the Y-direction or the deflecting direction (the second direction).

This can reduce the direction and amount of the movement of the electrically conductive member, thereby allowing stress generated as the electrically conductive member moves.

This can reduce the risk of rupturing the wires of the electrically conductive member due to stress.

The fourth advantage is that the contact member 18 does not move in the driving direction (the X-direction or the first direction) and also in the deflecting direction (the Y-direction or the second direction).

As described in the first embodiment, to stabilize the output of the vibration-type driving unit 24, it is important to reduce unnecessary vibrations of the contact member 18. The sixth embodiment has no cause of excitation, such as sliding with the movement of the contact member 18, leading to stabilization of the output of the vibration-type driving unit 24.

[Seventh Embodiment]

Figure 18:
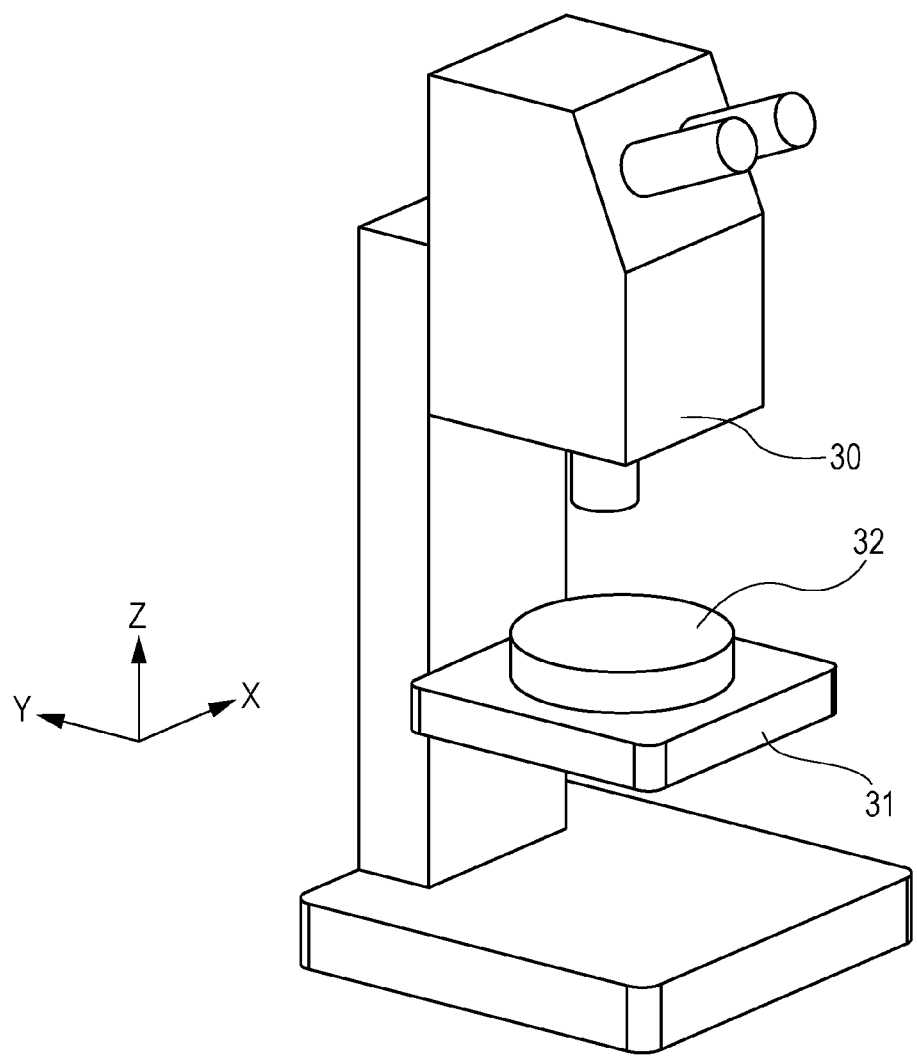
FIG. 18 is a perspective view of the configuration of a microscope, which is an image capturing apparatus of a seventh embodiment.

Next, a seventh embodiment will be described. FIG. 18 is a perspective view of an example configuration of a microscope, which is an image capturing apparatus of the seventh embodiment.

The microscope in FIG. 18 includes an image-capturing unit 30 accommodating an image sensor and an optical system and an automatic stage 31 including a two-dimensional driving apparatus 32.

An object to be observed is placed on the two-dimensional driving apparatus 32, and an enlarged image of the object is taken by the image-capturing unit 30. If an observation region is wide, the object is moved in the X-direction and the Y-direction with the two-dimensional driving apparatus 32 to acquire a large number of images.

The acquired images are combined with a computer (not shown) to form a high-definition image taken in a wide observation region.

The two-dimensional driving apparatus 32 is the same as that described in the sixth embodiment.

However, the component mounted to the moving body 19 changes from the optical lens 4 to the observation-target mount portion.

The object to be observed is placed on the observation-target mount portion, and an image of the object is acquired while the object is moved in two dimensions.

The two-dimensional driving apparatus 32 can rotate about the z-axis as in the sixth embodiment. This operation can be used to adjust the position of the object to be observed.

Although the seventh embodiment has been described using an example in which a two-dimensional driving apparatus including the vibration-type driving unit 24 of an embodiment of the present invention is applied to the automatic stage 31 of the microscope, the present invention is not limited thereto; the two-dimensional driving apparatus can be applied to stages of various apparatuses.

As described above, the use of the vibration-type driving units 24 according to the first to sixth embodiments can achieve an automatic stage in which an occupied space and unnecessary vibrations are reduced, and an output loss can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-083496, filed Apr. 12, 2013 and No. 2014-032214, filed Feb. 21, 2014, which are hereby incorporated by reference herein in their entirety.

What is claimed is:

1. A vibration-type driving device comprising:
a first vibrator including an electro-mechanical transducer;
a first contact member in contact with the first vibrator wherein the first vibrator and the first contact member are configured so that a relative position of the first vibrator and the first contact member changes in a first direction;
a first supporting member configured to support the first contact member;
a second vibrator including an electro-mechanical transducer;
a second contact member in contact with the second vibrator wherein the second vibrator and the second contact member are configured so that a relative position of the second vibrator and the second contact member changes in a second direction, the second direction intersecting the first direction;
a second supporting member configured to support the second contact member;
a moving body provided with the first vibrator and the second vibrator;
a first moving mechanism configured to allow the moving body and the first vibrator to move relative to the first support member in a third direction intersecting the first direction in a plane parallel to a plane in which the first vibrator and the first contact member are in contact with each other; and a second moving mechanism configured to allow the moving body and the second vibrator to move relative to the second support member in a fourth direction intersecting the second direction in a plane parallel to a plane in which the second vibrator and the second contact member are in contact with each other, wherein the first vibrator, the first contact member, and the moving body is configured so that the first vibrator and the moving body move relative to the first contact member when the first vibrator is driven, and wherein the second vibrator, the second contact member, and the moving body are configured so that the second vibrator and the moving body move relative to the second contact member when the second vibrator is driven.

2. The vibration-type driving device according to claim 1, wherein the first vibrator is shorter in length than the first contact member in the first direction.

3. The vibration-type driving device according to claim 1, wherein the first moving mechanism is disposed between the support member and the first contact member.

4. The vibration-type driving device according to claim 1, wherein the first moving mechanism includes a guide member movable in the third direction.

5. The vibration-type driving device according to claim 4, wherein the guide member includes a member having a curved portion that is rollable.

6. The vibration-type driving device according to claim 1, wherein the first moving mechanism includes an elastic member.

7. The vibration-type driving device according to claim 1, further comprising a limiting mechanism configured to limit the amount of relative movement of the first vibrator and the first contact member in the third direction.

8. The vibration-type driving device according to claim 1, further comprising a rotation mechanism configured to make the moving body rotatable relative to the first support member.

9. The vibration-type driving device according to claim 1, wherein the first direction is parallel to the third direction.

10. The vibration-type driving device according to claim 1, wherein the second direction is parallel to the fourth direction.

11. The vibration-type driving device according to claim 1, wherein the first direction is perpendicular to the second direction.

12. The vibration-type driving device according to claim 1, wherein the third direction is perpendicular to the fourth direction.

13. An image-blur correction apparatus comprising:
the vibration-type driving device according to claim 1; and
an optical lens or an image sensor mounted to the moving body of the vibration-type driving device.

14. An interchangeable lens comprising:
the vibration-type driving device according to claim 1; and
an optical lens mounted to the moving body of the vibration-type driving device.

15. An image capturing apparatus comprising:
the vibration-type driving device according to claim 1;
an optical lens or an image sensor mounted to the moving body of the vibration-type driving device; and
a power source.

16. An automatic stage comprising:
the vibration-type driving device according to claim 1; and
an observation-target mount portion mounted on the moving body.

17. A vibration-type driving device comprising:
a first vibrator including an electro-mechanical transducer;
a first contact member in contact with the first vibrator wherein the first vibrator and the first contact member are configured so that a relative position of the first vibrator and the first contact member changes in a first direction;
a first moving body comprising:
a first moving-body main portion;
a first vibrator fixing portion configured to fix the first vibrator; and
a first moving mechanism configured to move the first moving-body main portion relative to the first vibrator,
a second vibrator including an electro-mechanical transducer;
a second contact member in contact with the second vibrator wherein the second vibrator and the second contact member are configured so that a relative position of the second vibrator and the second contact member changes in a second direction, the second direction intersecting the first direction; and
a second moving body comprising:
a second moving-body main portion;
a second vibrator fixing portion configured to fix the second vibrator; and
a second moving mechanism configured to move the second moving-body main portion relative to the second vibrator,
wherein the first moving mechanism is configured to allow the first moving body main portion to move relative to the first vibrator in a third direction intersecting the first direction in a plane parallel to a plane in which the first vibrator and the first contact member are in contact with each other,
wherein the second moving mechanism is configured to allow the second moving body main portion to move relative to the second vibrator in a fourth direction intersecting the second direction in a plane parallel to a plane in which the second vibrator and the second contact member are in contact with each other,
wherein the first vibrator, the first contact member, and the first moving body are configured so that the first vibrator and the first moving body move relative to the first contact member when the first vibrator is driven, and
wherein the second vibrator, the second contact member, and the second moving body are configured so that the second vibrator and the second moving body move relative to the second contact member when the second vibrator is driven.

18. The vibration-type driving device according to claim 17, wherein the first moving mechanism includes a guide and a round bar provided at the moving body.

19. The vibration-type driving device according to claim 17, wherein the first direction is parallel to the third direction.

20. The vibration-type driving device according to claim 17, wherein the second direction is parallel to the fourth direction.

21. The vibration-type driving device according to claim 17, wherein the first direction is perpendicular to the second direction.

22. The vibration-type driving device according to claim 17, wherein the third direction is perpendicular to the fourth direction.

23. An image-blur correction apparatus comprising:
the vibration-type driving device according to claim 17; and an optical lens or an image sensor mounted to the moving body of the vibration-type driving device.

24. An interchangeable lens comprising:
the vibration-type driving device according to claim 17; and
an optical lens mounted to the moving body of the vibration-type driving device.

25. An image capturing apparatus comprising:
vibration-type driving device according to claim 17;
an optical lens or an image sensor mounted to the moving body of the vibration-type driving device; and
a power source.

26. An automatic stage comprising:
vibration-type driving device according to claim 17,
wherein the moving body has an observation-target mount portion.

* * * * *